(12) United States Patent
Morse et al.

(10) Patent No.: US 10,993,424 B1
(45) Date of Patent: May 4, 2021

(54) FISHING ROD AND REEL ATTACHMENT

(71) Applicants: Stephen Morse, Ventura, CA (US); Daniel Rubin, Ventura, CA (US)

(72) Inventors: Stephen Morse, Ventura, CA (US); Daniel Rubin, Ventura, CA (US)

(*) Notice: Subject to any disclaimer, the term of this patent is extended or adjusted under 35 U.S.C. 154(b) by 191 days.

(21) Appl. No.: 16/150,587

(22) Filed: Oct. 3, 2018

Related U.S. Application Data

(60) Provisional application No. 62/567,388, filed on Oct. 3, 2017.

(51) Int. Cl.
| | | |
|---|---|---|
| *A01K 87/00* | (2006.01) | |
| *A01K 87/06* | (2006.01) | |
| *A01K 89/00* | (2006.01) | |
| *A01K 89/01* | (2006.01) | |
| *A01K 89/015* | (2006.01) | |

(52) U.S. Cl.
CPC ............. *A01K 87/06* (2013.01); *A01K 87/00* (2013.01); *A01K 89/00* (2013.01); *A01K 89/01* (2013.01); *A01K 89/01925* (2015.05)

(58) Field of Classification Search
CPC .. A01K 87/00; A01K 87/06; A01K 89/01925; A01K 89/00; A01K 89/01
USPC .................................................. 43/18.1 R, 22
See application file for complete search history.

(56) References Cited

U.S. PATENT DOCUMENTS

| | | | | |
|---|---|---|---|---|
| 1,154,123 A | * | 9/1915 | Camilleri | A01K 87/06 43/22 |
| 3,269,049 A | * | 8/1966 | Emmons | A01K 91/06 43/23 |
| 8,966,808 B2 | * | 3/2015 | Huang | A01K 87/06 43/21.2 |
| 2014/0101983 A1 | * | 4/2014 | Scott | A01K 87/06 43/22 |

* cited by examiner

*Primary Examiner* — Darren W Ark
*Assistant Examiner* — Steven J Shur
(74) *Attorney, Agent, or Firm* — Sandy Lipkin

(57) ABSTRACT

An improved rod and reel attachment for a fishing rod that provides an improved method for securing a reel to the rod wherein the reel is attachable to the foot on the attachment that slides through a dovetail channel and is secured thereon with a locking pin that allows for quick and secure attachment and de-attachment of a reel to a rod.

1 Claim, 7 Drawing Sheets

FISHING ROD AND REEL ATTACHMENT

REFERENCE TO PRIOR APPLICATION

This application claims priority of the provisional patent application 62/567,388, filed Oct. 3, 2017 entitled FISHING ROD AND REEL ATTACHMENT by Stephen Morse.

BACKGROUND OF THE INVENTION

Field of the Invention

The field of this invention relates generally to the field of fishing rod and reel attachments for fishing and more specifically toward an attachment of rod to reel that can be securely attached and released in a couple of seconds.

Description of the Prior Art

Most fishing rods are typically comprised of a fishing rod with "tip" and 'butt' (handle) section on which a fishing reel is mounted. The mounting section on the reel is referred to as the "foot." The mounting section on the fishing rod is referred to as the "base". The "reel seat" is the part of the base where the reel is attached. The base and reel seat provide a means to attach a reel to the rod. On most fishing reels the foot is composed of two protrusions forward and back to secure the fishing reel to the base. The foot is inserted onto the reel seat into a secured groove or socket that is permanently built into the rod base. The rear (or forward) foot is inserted and secured by sliding shroud and threaded "ring(s)". The reel foot is placed on top of the seat, the shroud is moved into place by screwing down the rings.

Additionally, larger reels and most saltwater reels have added a bracket that fits around the reel seat secured by two screws. This is done in case the existing shroud or ring piece fails or the reel seat, often made of plastic, fails as it may become brittle over time and crack. The added clamp makes for a bulky and often heavy design. Pieces can be lost or fall overboard when assembling and de-assembling rods and reels, which is necessary for proper storage, transportation, service and cleaning of the rods and reels. Reels have been attached to fishing rods this way for over one hundred years. This connection often fails making it difficult if not impossible to properly land a large fish.

It is the object of the instant invention to provide an improved method and apparatus that overcomes the shortcomings of the prior art.

SUMMARY OF THE INVENTION

The basic embodiment of the present invention teaches a fishing rod and reel attachment comprising: a substantially cylindrical base with a dove tail joint channel; a foot that fits into said dove tail joint channel on said base; and a locking pin to secure said foot to said base.

The above embodiment can be further modified by defining that said foot has a protrusion that slides into said dove tail joint channel, said protrusion mating with a groove in said dove tail joint channel.

The above embodiment can be further modified by defining that said foot has an elevated platform for the securing thereto of a reel.

The above embodiment can be further modified by defining that said elevated platform has thereon one or more apertures for said securing thereto of a reel by matching up with the screw pattern on said reel.

The above embodiment can be further modified by defining that said locking pin is held in place with a grub screw, ball and compression spring.

The above embodiment can be further modified by defining that said locking pin has a recessed portion thereon that locks into place with a groove on the underside of said protrusion on said foot.

BRIEF DESCRIPTION OF THE DRAWINGS

For a better understanding of the present invention, reference is to be made to the accompanying drawings. It is to be understood that the present invention is not limited to the precise arrangement shown in the drawings, as different fishing reels have slightly different feet and means of attachment.

DETAILED DESCRIPTION OF A PREFERRED EMBODIMENT

Figure 1:
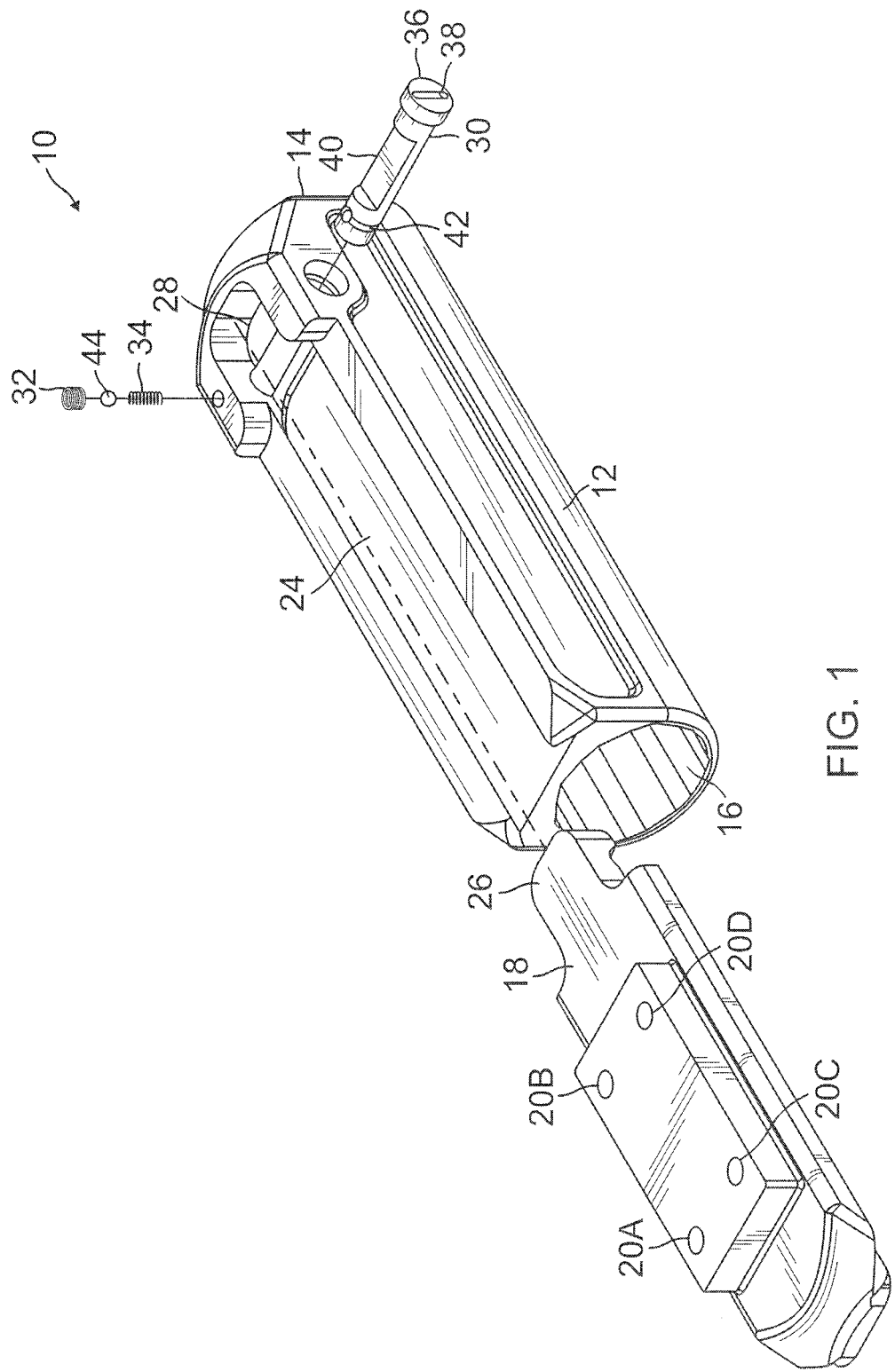
FIG. 1 is an exploded view of the fishing reel seat (base) and foot attachment of the instant invention.
Figure 2A:
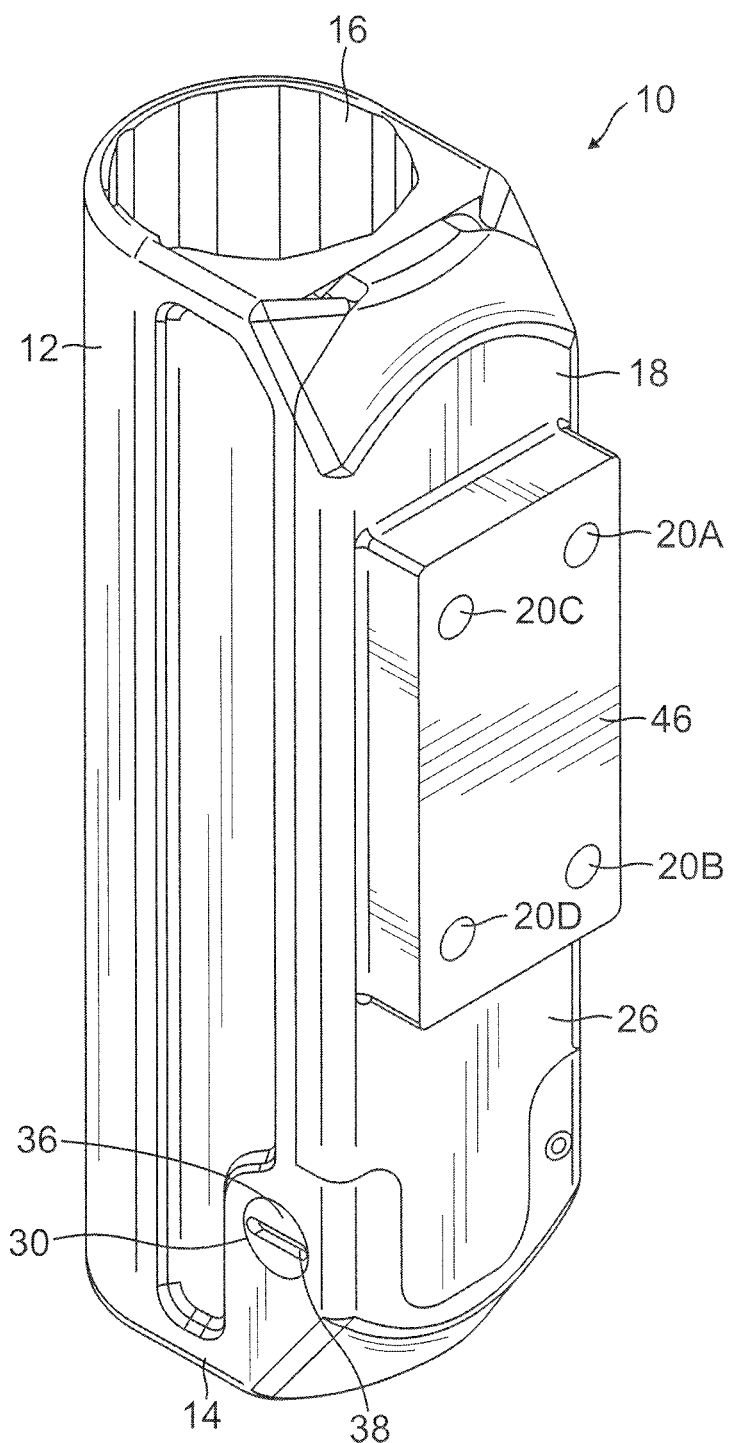
FIG. 2A is front perspective view of the fishing reel seat (base) and foot attachment of the instant invention.
Figure 2B:
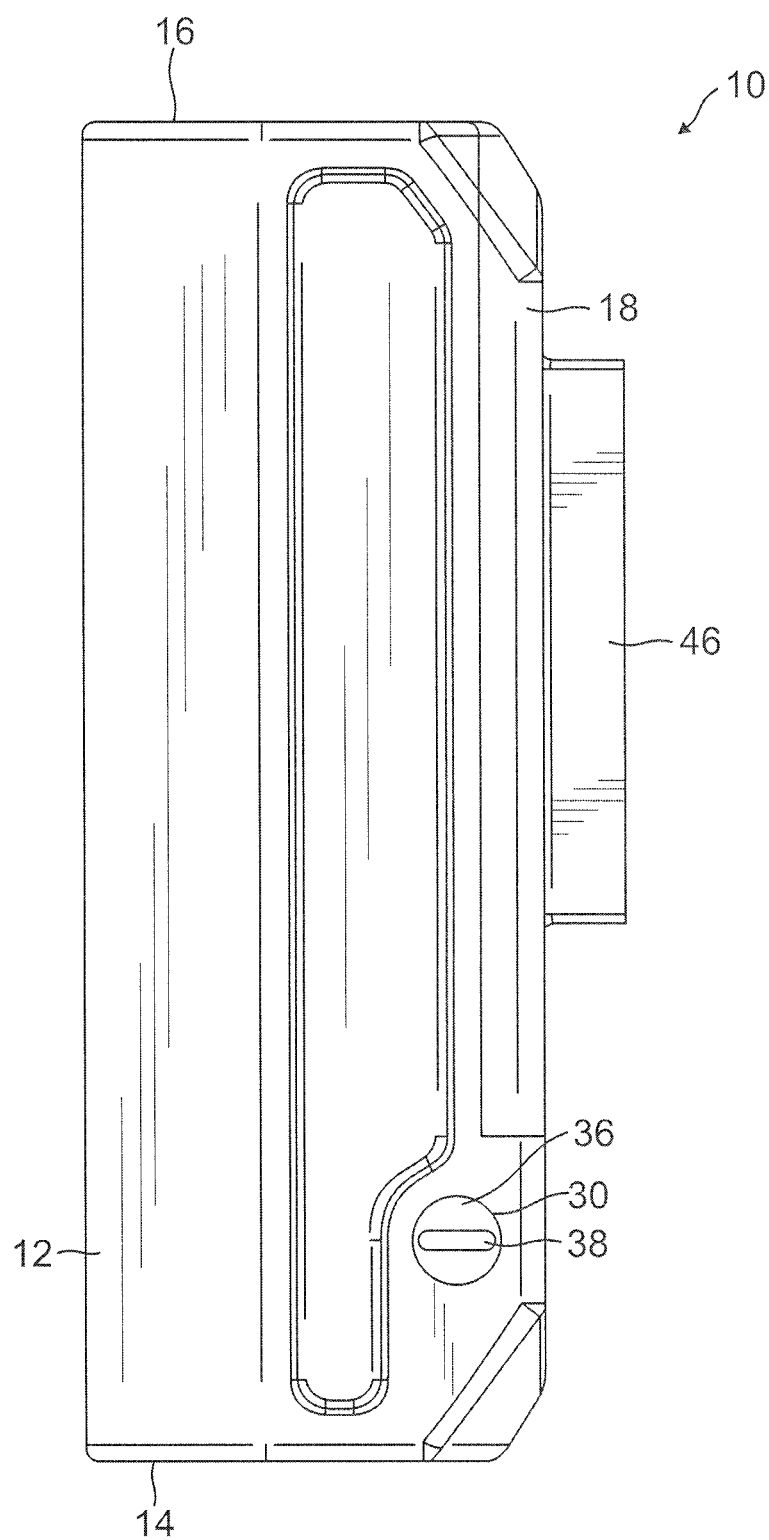
FIG. 2B is a side view of the seat (base) and foot attachment of the instant invention.
Figure 2C:
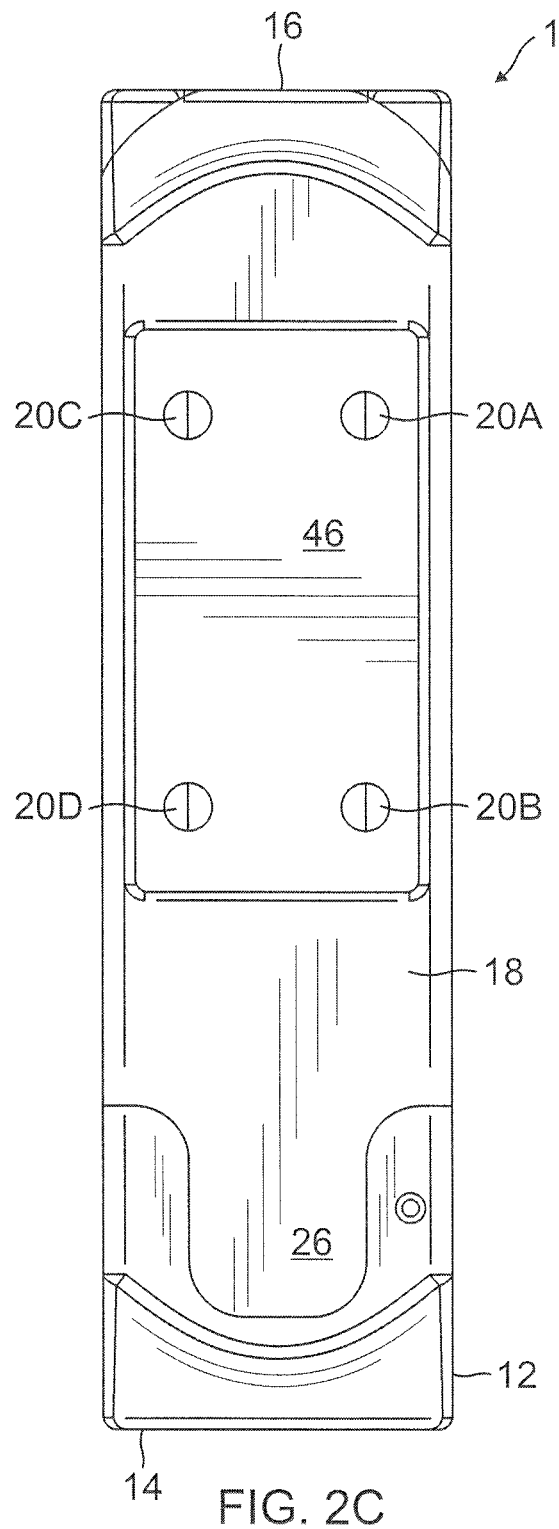
FIG. 2C is a top view of the seat (base) and foot of the instant invention.
Figure 3A:
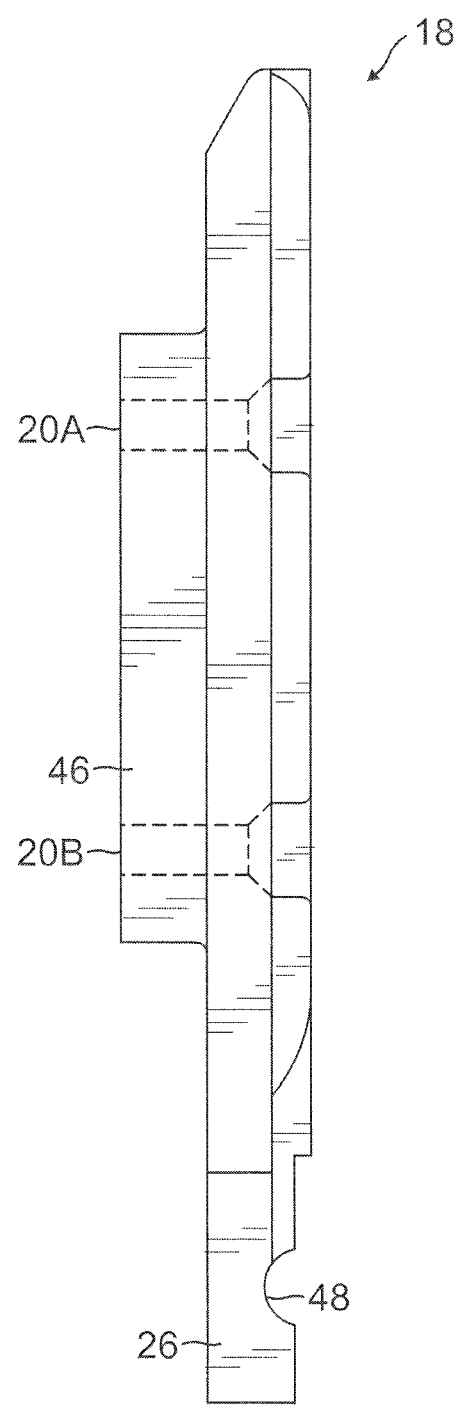
FIG. 3A is a side view of the fishing reel foot of the rod and reel attachment of the instant invention.
Figure 3B:
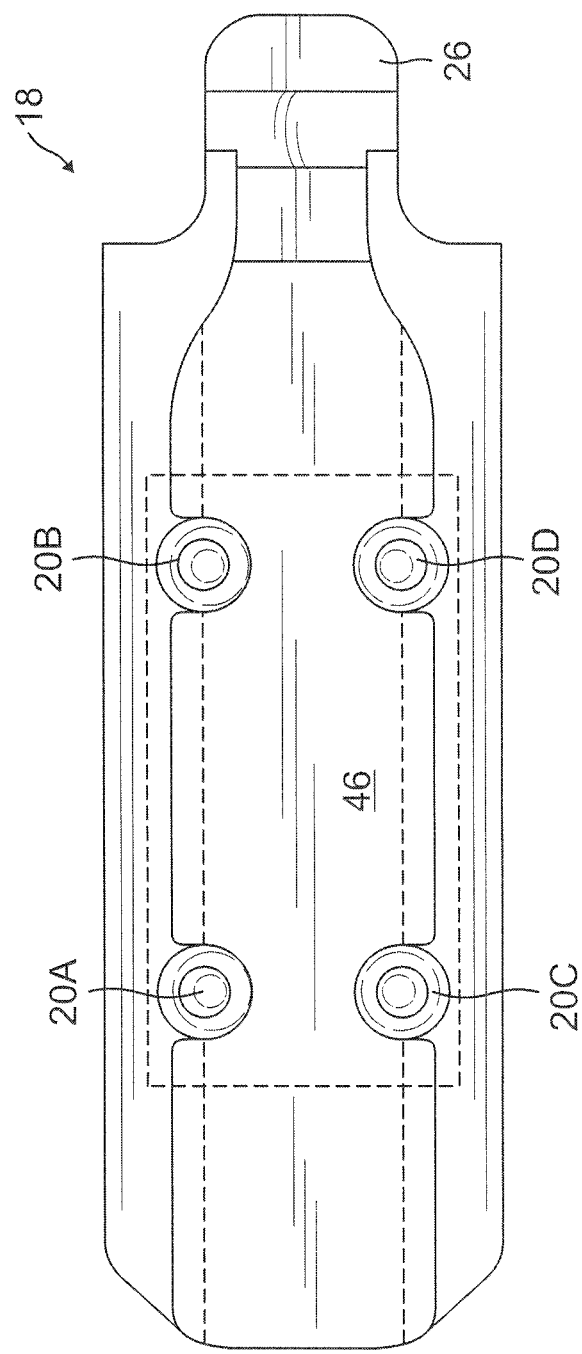
FIG. 3B is a top view of the fishing reel foot of the rod and reel attachment of the instant invention.
Figure 3C:
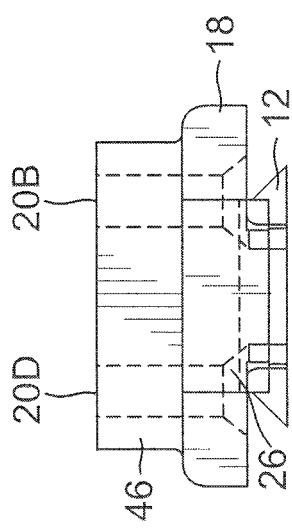
FIG. 3C is a front view of the fishing reel foot of the rod and reel attachment of the instant invention.
Figure 3D:
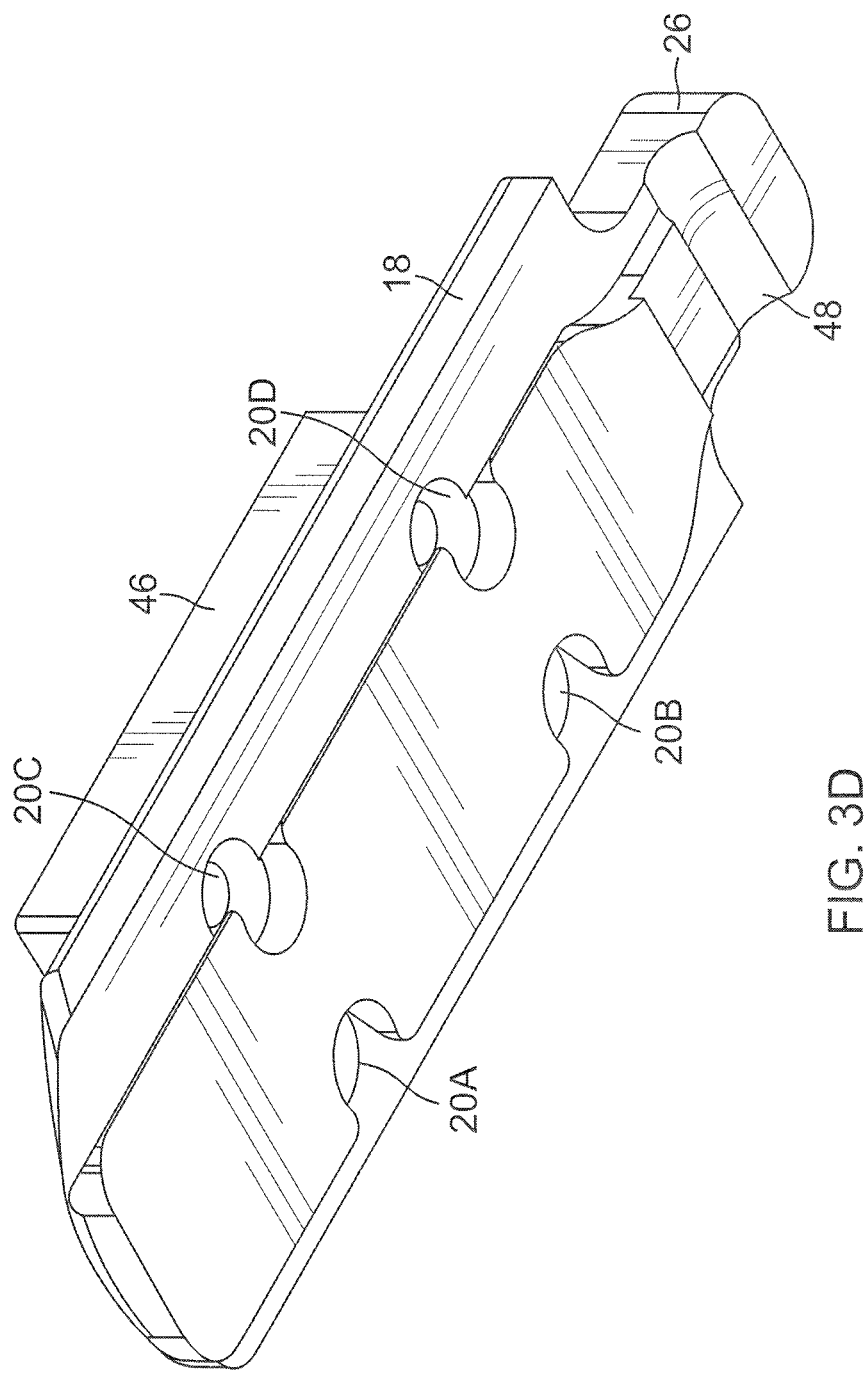
FIG. 3D is a bottom view of the fishing reel foot of the rod and reel attachment of the instant invention.
Figure 4:
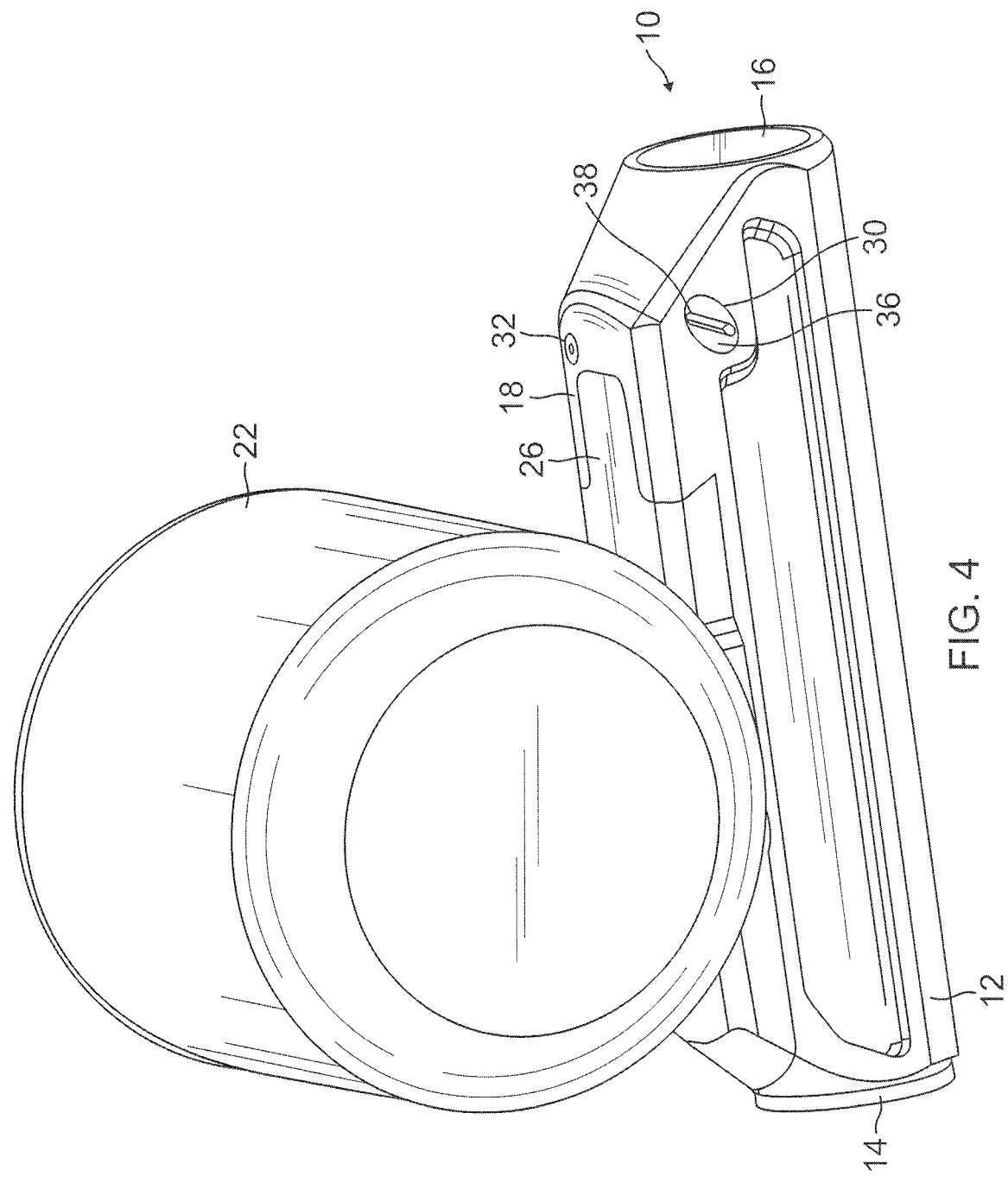
FIG. 4 is a side perspective view of the fishing rod base and reel attachment of the instant invention with a reel secured thereon.

Turning to the drawings, the preferred embodiment is illustrated and described by reference characters that denote similar elements throughout the several views of the instant invention.

The instant invention adds significant functional advantages to existing rod and reel connection making for a quicker and stronger attachment system that can be snapped and locked securely into place in a matter of a couple of seconds rather than the several minutes as required with prior art systems. Furthermore, the device of the instant invention can be made from a variety of modern materials making for a better looking, lighter and stronger connection than what currently exists in the state of the art.

When fishing, the angler depends on establishing a secure stable connection of the fishing reel to the reel seat and rod butt or base section of the fishing rod. Without this secure and stable connection, when casting line from the reel or fighting a fish, the reel foot and base connection can turn or wiggle loose in the seat on the fishing rod. This can lead to the reel falling off the rod or shifting position. If the reel shifts, the angler cannot properly fight or land the fish increasing the risk of a broken line when fighting a fish.

The device of the instant invention insures that the reel is not moving on its base, which is a significant problem currently encountered with the old design especially after continued use or long hours of fighting large fish.

Another advantage of the instant device is that the same reel can easily and quickly be mounted on multiple rods, i.e., multiple reels can be swapped with multiple rods in seconds back and forth.

The connection device 10 of the instant invention is relatively simple and comprised of two pieces as shown in the attached figures and drawings. The base 12 is the larger of the two pieces and becomes part of the fishing rod (not shown, but which travels through the base 12 through the first hole 14 and exits through the second hole 14). The new foot 18 replaces the old fishing reel foot that would typically be found on modern reels. Most modern reel feet screw in to the reel and can easily be swapped out with the new foot 18 of the instant invention.

There are four (4) holes 20A, 20B, 20C, 20D on an elevated platform 46 on the foot 18 that match up with the screw pattern from the reel 22 and then the reel 22 with new foot 18 then slides onto the base 12. The foot 18 slides into a dove tailed channel 24 on the base 12 and a top protrusion 26 on the foot 18 is secured into a slot 28 that is shaped to mate with the protrusion 26 and is secured in place through the placement perpendicularly therethrough of a locking pin 30 held in place with a grub screw 32, ball 44 and compression spring 34. (See FIG. 1)

A groove 48 on the bottom side of the protrusion 26 on the foot 18 locks into a mating position with the locking pin 30. The locking pin 30 has on one end a flattened surface 36 with a linear groove 38 to allow for ease of turning. The length of the locking pin 30 includes a recessed portion 40 that provides a seat for the protrusion 26 on the foot 18 when it is inserted therein. On the other end of the locking pin 30 is an aperture 42 for the placement therein of the compression spring 34, the ball 44 and the grub screw 32.

To use, the angler affixes a fishing rod through the first and second holes 14, 16 in the base 12. Then the foot 18 is released for attachment to a reel 22 thereon. The reel 22 lines up with the four holes 20A, 20B, 20C, 20D on the elevated platform 46 of the foot 18 and is secured at which point the foot 18 then slides through the channel 24 on the base 12 with the protrusion end 26 being directed toward the slot 28. Once the foot 18 is secure in the slot 28, the locking pin 30 can be turned to lock the foot 18 in place for use.

This connection takes only a second or two to perform. This is stronger, lighter, and less cumbersome than the current systems in the art.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A fishing rod and reel attachment comprising:
   a cylindrical base with a first end and a second end and apertures on each of said first and second ends which creates a channel therethrough into which a fishing rod can be placed and secured therein for a secure, strong connection, said base having a dove tail joint channel along a length of said cylindrical base said dove tail joint channel having an entry end and a securing end;
   a foot that fits into said dove tail joint channel on said base, wherein said foot is slideable into said dove tail joint channel at said entry end of said dove tail joint channel, said foot further comprising:
      a first end;
      a second end;
      a top side;
      a bottom side;
      a protrusion extending from said first end that slides into said entry end of said dove tail joint, said protrusion having a recessed portion on said bottom side;
      an elevated platform on said top side of said foot for the securing thereto of a reel, wherein said elevated platform has apertures thereon into which to secure said reel;
   wherein said securing end of said dove tail joint channel further comprises a vertical portion that is taller than said dove tail joint channel that provides an obstacle to stop said foot as it slides therethrough and wherein said vertical portion has extending outwardly therefrom and perpendicular to said channel two flanges, one of which has an aperture through which a locking pin can be placed to secure said foot to said base, said locking pin further comprising:
      a first end that enters through said aperture;
      a second end with a flat surface with a linear groove thereacross;
      a cylindrical main body between said first and second ends with a recessed portion across said cylindrical body, wherein said locking pin is rotatable through actuation of said linear groove,
   wherein said locking pin is held in place with a grub screw, ball and compression spring and
   wherein said recessed portion mates with said recessed portion on said bottom of said protrusion of said foot,
   wherein when said locking pin is rotated in a first direction it locks said foot to said base and when rotated in a second direction it releases said foot from said base.

* * * * *